United States Patent [19]

Roujon

[11] Patent Number: 4,566,428
[45] Date of Patent: Jan. 28, 1986

[54] WIRE SAW FOR SHAPING GRANITE AND OTHER STONE

[76] Inventor: Auguste Roujon, 28, Place Frederic Bompaire, 12100 Millau, France

[21] Appl. No.: 604,520

[22] Filed: Apr. 27, 1984

[30] Foreign Application Priority Data

Apr. 27, 1983 [FR] France ............... 83 05479

[51] Int. Cl.⁴ .............................................. B28D 1/30
[52] U.S. Cl. .................................................. 125/21
[58] Field of Search ................................ 125/16 R, 21

[56] References Cited

U.S. PATENT DOCUMENTS

| | | | |
|---|---|---|---|
| 1,017,207 | 2/1912 | Eggers | 125/21 |
| 1,706,406 | 3/1929 | Legge | 125/21 |
| 2,674,238 | 4/1954 | Dessureau | 125/21 |
| 2,803,239 | 8/1957 | D'Avaucourt | 125/21 |
| 2,866,448 | 12/1958 | Dressureau et al. | |
| 3,158,146 | 11/1964 | Allen | 125/21 |

FOREIGN PATENT DOCUMENTS

| | | |
|---|---|---|
| 108526 | 7/1898 | Fed. Rep. of Germany. |
| 2754200 | 6/1979 | Fed. Rep. of Germany. |
| 414400 | 9/1910 | France. |

*Primary Examiner*—Harold D. Whitehead
*Attorney, Agent, or Firm*—Sandler & Greenblum

[57] ABSTRACT

A wire saw for shaping granite and other stone which makes it possible to shape granite or other stone in many other configurations other than planar slices. The wire saw includes a fixed vertical frame and chassis adapted to ascend and descend within the frame. A means for controlling the velocity of this chassis movement is effected through counterweight, motor, and guide panel system. A stone block-carrying carriage that is displaced in a horizontal direction and is controlled by a means of a counterweight and guide panel system imparts a second degree of motion that permits the shaping of new configurations on stone.

25 Claims, 5 Drawing Figures

WIRE SAW FOR SHAPING GRANITE AND OTHER STONE

BACKGROUND OF THE INVENTION

1. Field of the Invention

The present invention relates to a wire saw for shaping granite and other stone.

2. Description of Pertinent Information

Wire saws presently exist that can cut only in a vertical direction to obtain planar cuts or slices of stone. Such traditional wire saws comprise a fixed frame having the form of a gantry whose uprights are comprised of "U"-shaped beams that form guides. A bearing block carrying a wire pulley slides vertically upward and downward within these uprights. Such bearing blocks are supported by cable wound on a cylinder positioned above the uprights and guide cable by means of a pulley below each upright. Descent of the bearing block during sawing is controlled by an automatic lowering system ensuring regular and constant descent velocity. The block-carrying carriage is immobile during the sawing; thus this system can only be applied to vertical sawing resulting in planar cuts.

SUMMARY OF THE INVENTION

The wire saw according to the present invention makes it possible to perform a very large number of cutting operations unlike the prior art. Further, the wire saw of the present invention makes it possible to shape curved portions of flagstones of stone or granite of all dimensions currently employed in the stone-cutting industry.

To achieve these goals, the present invention provides a wire saw comprising a fixed vertical frame, block-carrying carriage, a translationally movable or chassis that moves inside the fixed frame, a wire band saw tensioning apparatus, a pump, and an abrasive liquid distributor apparatus. It further comprises means allowing for automatic descent and ascent of the movable chassis free from all constant and regular pressure of mechanical origin and means for controlling translational movement of the stone block-carrying carriage through a system of counterweighting and the use of a guide panel in combination with the movable chassis. These two movements, i.e., the movement of the chassis and the movement of the stone block-carrying carriage, occur at different speeds.

BRIEF DESCRIPTION OF THE DRAWINGS

Other advantages and characteristics will become clear in the description below and with reference to the attached drawings of an embodiment given by way of non-limiting example in which.

DETAILED DESCRIPTION OF PREFERRED EMBODIMENTS

Figure 1:
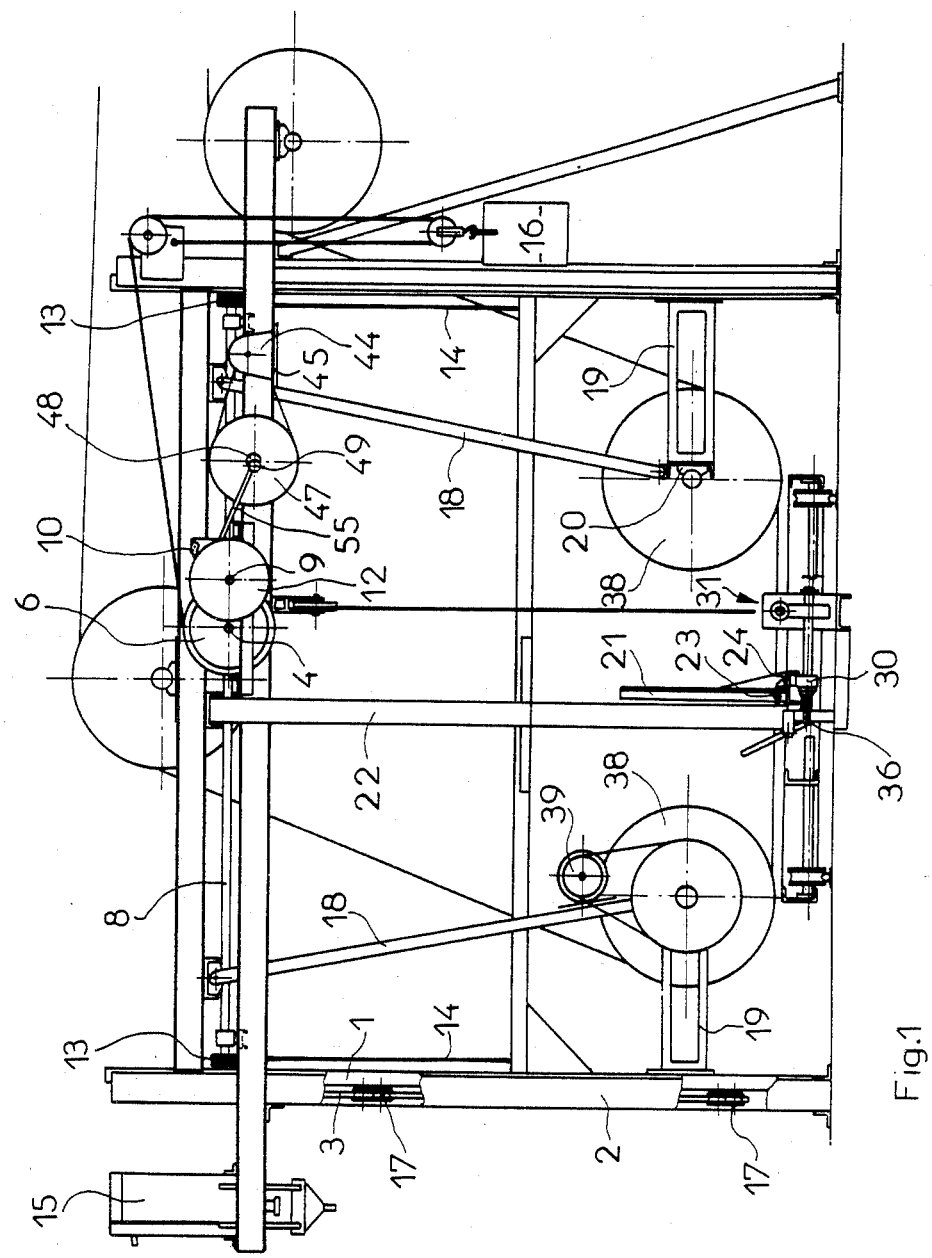
FIG. 1 is a view of the rear surface of the wire saw.
Figure 2:
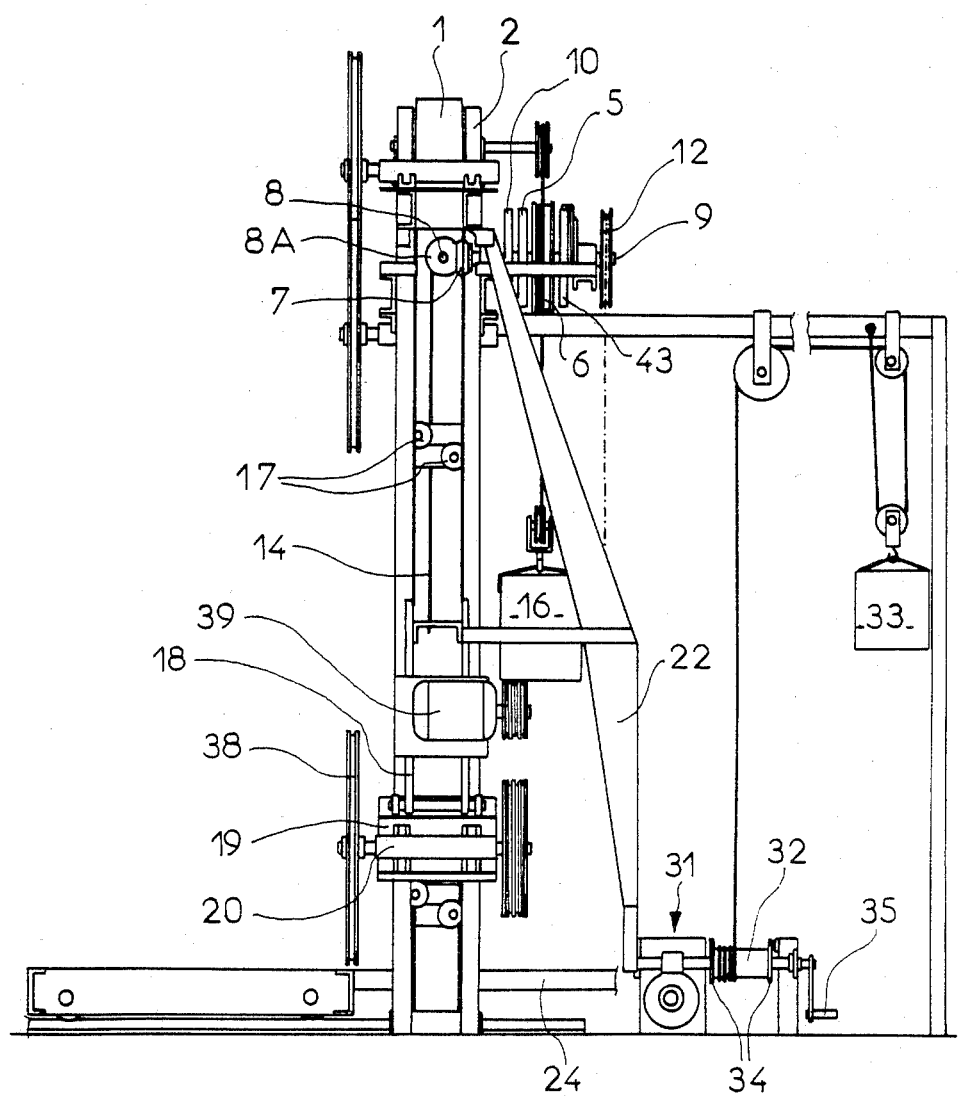
FIG. 2 is a side view of the wire saw.
Figure 3:
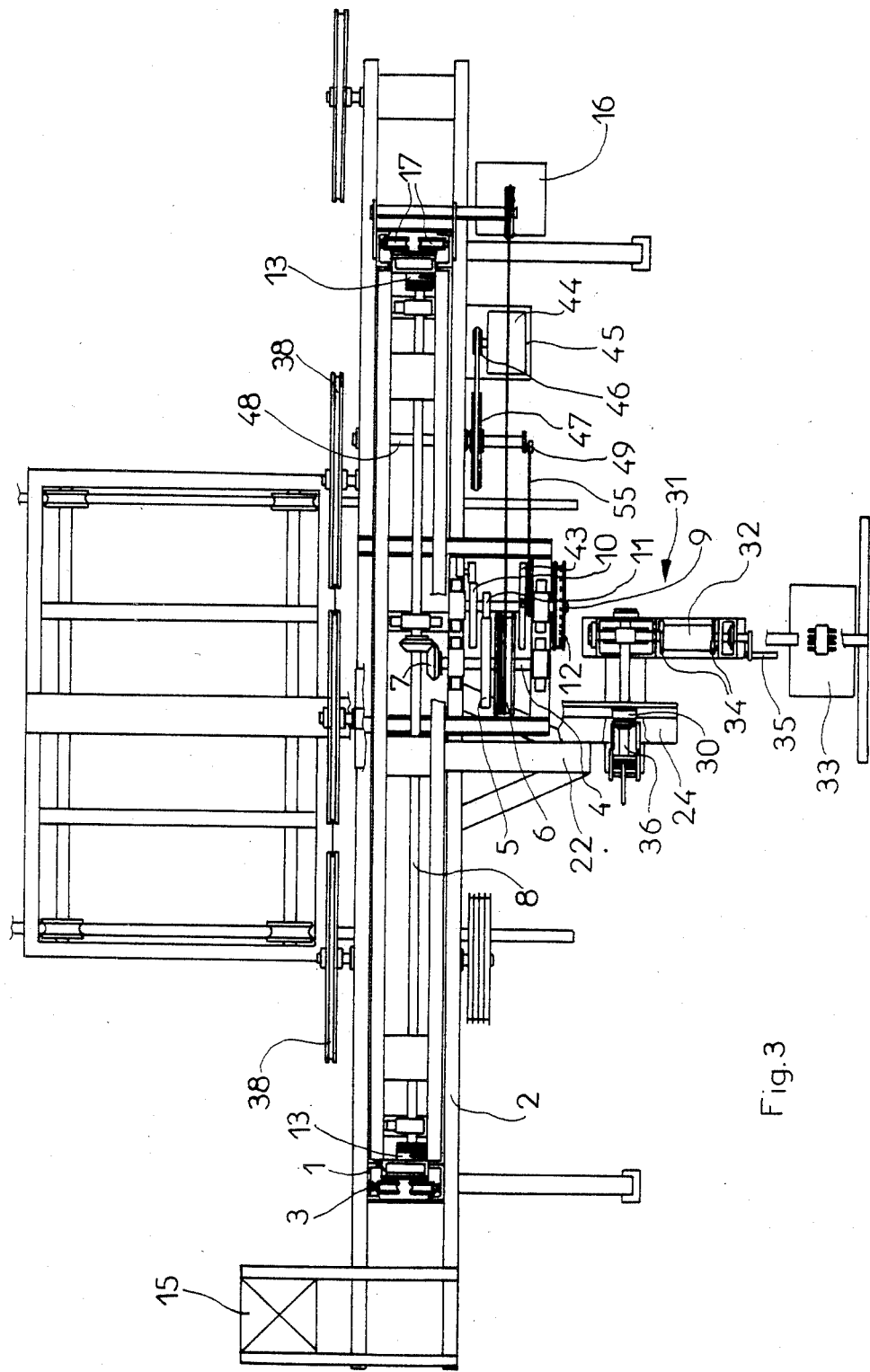
FIG. 3 is a top view of the wire saw.

The wire saw according to the present invention shown in FIGS. 1, 2, and 3 comprises a translationally movable chassis 1 that moves vertically in a preferably supported fixed frame 2. Fixed frame 2 comprises four upright beams provided over their entire inner lengths with rails 3. Two of each of the beams are joined at their bases by a short transverse beam so that two "U"-shaped uprights or beams are formed. These uprights are preferably connected to one another at their two upper ends by two crossbeams of "U" cross-section.

Movable chassis 1 preferably comprises four beams similarly joined at their bases like fixed frame 2 to form two "U"-shaped uprights having a U-shaped cross-section and on which are attached at least one wheel 17 circulating on rails 3 of the uprights of fixed frame 2 so as to guide movable chassis 1 along the rails 3 of the inner uprights of fixed frame 2. The uprights of movable chassis 1 are joined at their upper end by means of "U"-shaped crossbeams so that these uprights are integral with each other. Another "U"-shaped crossbeam is attached at mid-height between the uprights of movable chassis 1.

Chassis lowering systems of known types are inapplicable to the present invention when cuts to be made in stone are not planar. The reason is that the velocity of descent of such systems, i.e., displacement and speed, is constant, but to produce stores of different shapes the velocity of descent of the movable chassis must vary. To cause the velocity of descent of chassis 1 to be variable in the present invention, a means controlling descent and ascent of movable chassis 1 is attached to a frame which is attached the U-shaped crossbeams of fixed frame 2. This controlling means comprises a toothed wheel 5 and a drum 6 that are integral with a rotatable shaft 4. Drum 6 winds a cable that controls the ascent and descent of counterweight 16. In addition, a conical pinion 7 is provided which is integral with one end of shaft 4. Pinion 7 meshes with a second conical pinion 8A that drives a shaft 8 on whose ends are mounted cable drums 13. Shaft 8 extends longitudinally in the direction of the horizontal length of the crossbeams of fixed frame 2. Cable 14 is wound on drums 13 located at each end of shaft 8 and integral with shaft 8. Each end of cable 14 is attached respectively to each drum and to the mid-height crossbeam of movable chassis 1. The control means also comprises a toothed wheel 11 which meshes with toothed wheel 5 for reduction. Toothed wheel 11 is integral with shaft 9 as are chain operating wheel 12 that cooperates with ratchet 10 that is provided with a latch to block descent of movable chassis 1. Shaft 9 and its integral wheels serve to control the speed of rotation and hence the speed of descent or ascent of movable chassis 1.

At one end of the crossbeams of fixed frame 2 is positioned an abrasive liquid distributor reservoir 15. At the other end of the crossbeams of fixed frame 2 is mounted a wire pulley and bearings. A counterweight support 16 connected by cable to drum 6 integral with shaft 4 is attached on the upper level of one of the "U"-shaped uprights. Counterweight 16 counterbalances the weight of movable chassis 1, and by choosing the weight of the counterweight to be less than the weight of movable chassis 1, the speed of descent of movable chassis 1 will be determined. The velocity of descent is controlled by means of a guide panel 21 configured to the desired shape of the stone to be cut and a guide arm 22. For example, to shape granite, the weight of counterweight 16 is chosen so that chassis 1 is lowered at a velocity of approximately one centimeter per minute. This means of control will be explained below.

Another lowering means preferably comprising an automatic lowering system is provided which allows a varible descent velocity. This lowering means comprises a motor 44 of a predetermined power, for example, 0.5 horsepower. Motor 44 is adapted for low speeds, and is positioned on a platform 45 attached under the lower wing of a crossbeam of fixed frame 2 (see FIG. 1). For this lowering means to function properly, the load of counterweight 16 should be chosen to be exactly equal to that of the weight of movable chassis 1 so that an equilibrium condition is reached.

The lowering means further comprises a pinion 46 engaging a sprocket chain that connects a toothed wheel 47 to motor 44. In addition wheel 47 is integral with shaft a 48 positioned on a crossbeam of fixed frame 2. The speed of rotation of motor 44 is reduced through this gearing arrangement and motor 44 provides the motive power for driving movable chassis 1. Also provided is an eccentric cam 49 positioned at one end of shaft 48.

A ratchet wheel 43 is integral with shaft 9, so as to turn freely on shaft 9 by means of a roller. A slide is also positioned on shaft 9 and is provided with an engagement plate that rests on ratchet wheel 43 and is maintained in this position by a spring. A connecting arm 55 pivots about shaft 9 and engages the teeth of ratchet wheel 43 to lock ratchet wheel 43 after advancement. Connecting rod 55 is actuated by eccentric cam 49. Ratchet wheel 43 thus driven through connecting rod 55 by eccentric cam 49 turns shaft 9 and transmits motion through reduction gear 11 (toothed wheel 11) to toothed wheel 5 integral with shaft 4 that in turn transmits rotary motion through pinion gears 7 and 8A to shaft 8 integral with cable drums 13 and cables 14 attached thereto and to the mid-height crossbeam of movable chassis 1. The latch associated with ratchet wheel 10 is engaged during automatic lowering.

Movable chassis 1 descends so long as no obstacle opposes it. Resistance caused by configurations of guide panel 21 transmitted through guide arm 22, however, causes the engagement plates to disengage the latch, and slides on ratchet wheel 43. Descent displacement is determined by the number of teeth taken by the latch; consequently once the latch is disengaged displacement is suspended.

Movable chassis 1 is equipped on its rear portion with guide arm 22 noted above, at the bottom of which is positioned a roller 23 integral with a threaded rod that controls retraction or advancement of guide panel 21. This guide panel, which cooperates with the upper crossbeams of movable chassis 1, preferably is supported by the mid-height crossbeam to prevent oscillatory movement, and is reinforced on its wings.

Two arms 18 are also provided so as to be fixed under the upper crossbeams of movable chassis 1 and are adapted to urge wire pulleys 38 towards one another. The spacing between wire pulleys 38 that guide the wire band saw varies depending upon the sizing and configuration of the stone work and the physical size of the stone to be cut. Pulleys 38 must be as close as possible to the piece to be cut as to obtain good tensioning of the wire and so that slack is avoided in the wire band saw. Saw tension must be maintained as any slack in the wire band saw as it cuts will result in imprecise cuts in the stone. Each of arms 18 comprises two elements positioned on each side against the mid-height crossbeam so that lateral displacement of the arms is avoided and vibrations are dampened. Two telescoping dividers 19, positioned between the uprights of fixed frame 2, and bearing block supports 20 of wire pulleys 38 fix the necessary spacing.

The stone block-carrying carriage moves translationally on rails with respect to the wire saw apparatus. The carriage is provided with a bar 24 (contrary to block carrying carriages presently in use) overlaid along its entire length by angle iron 25 preferably welded to the bar. Angle iron 25 is bored throughout almost the entirety of its length by a slit 26 (see FIG. 4). The horizontal arm of an angle arm 27 contacts angle iron 25 and is provided with two bolts that cooperate with slit 26. Angle iron 27 can be displaced along the length of angle iron 25 due to the configuration of slit 26. A vertical arm of angle iron 27 in the shape of a cross 28 imparts stability to this guide mechanism. Crosspiece 28 is provided with a slit in which guide panel 21 can be positioned.

Displacement of the stone block-carrying carriage is effected by means of a rack 29 positioned above bar 24. Mechanical means controls displacement of the carriage in a single direction and comprises a gear 30 that cooperates with rack 29 through a screw gear 31 mounted on the shaft carrying gear 30, whose screw-crown ratio lies between 1:20 and 1:25 and by a drum 32 for winding a cable connected to counterweight 33.

Drum 32 is mounted on the shaft integral with gear 30 at one end. Due to the reduction caused by gears 30 and 31, displacement of the carriage depends upon the load counterweight 33 imposes on gear 30. The speed of displacement is adjusted through screw gear 31 and the weight of counterweight 32 to whatever rate is desired. Guide panel 21 regulates the differential velocity of the carriage. The velocity of displacement of the carriage must be adjusted to approximately one centimeter per minute, when chassis 1 is so adjusted for granite.

Ratchet plate 34 is sized to the same circumference as the side plates of drum 32 and are integral therewith so that carriage movement can be stopped in the forward or rearward direction depending upon the winding direction of the cable 21. A handle 35 serves to raise counterweight 33 by cranking and is positioned at the end of the shaft engaged by screw gear 31. To prevent displacement of the carriage while counterweight 33 is being raised, cooperating gear 30 that drives rack 29 can be released by a gear disengagement system 36.

Figure 4:
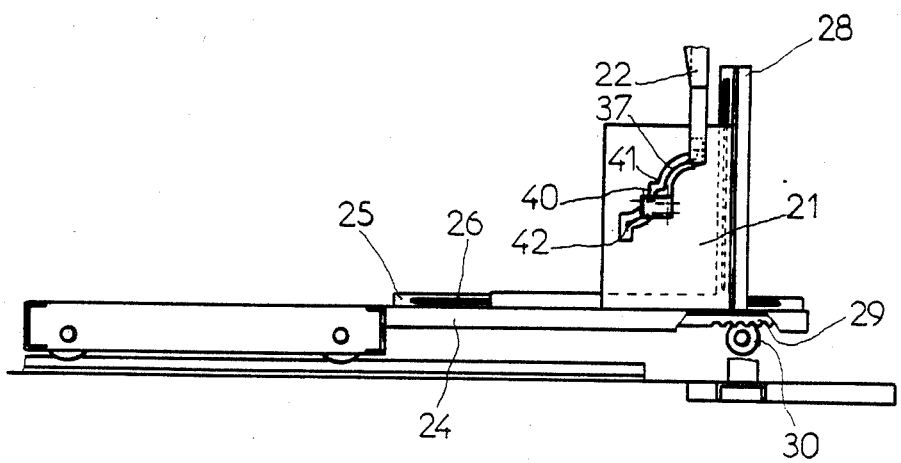
FIG. 4 is a view of the stone block-carrying carriage of the wire saw.
Figure 5:
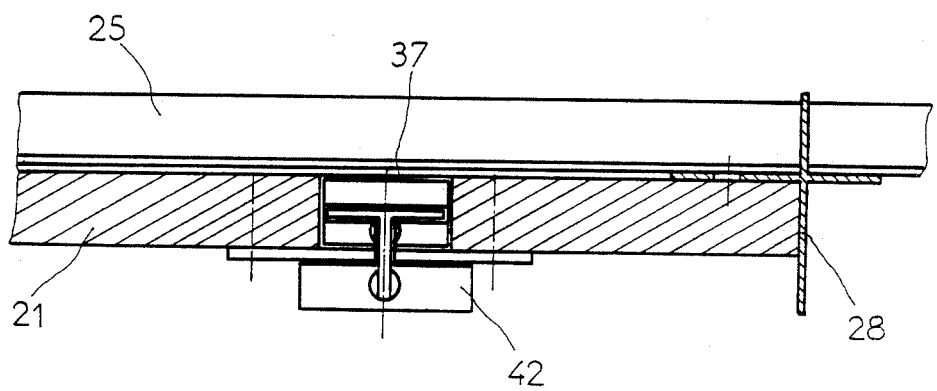
FIG. 5 is a cross-sectional view of the guide panel provided with a pin along AA of FIG. 4.

Guide panel 21 shown in FIG. 4 is preferably formed of a hard wood and is cut to the exact shape desired in the stone block. Guide panel 21 has an opening therein for receiving a roller 23. Roller 23, positioned at the bottom of guide arm 22, is carried on each side of a profile line 37 that traces the cut to be made in a stone block. Profile line 37 has a width substantially greater than the radius of roller 23 so that roller 23 easily traverses the profile opening.

Profile line 37 exactly describes the configuration for the shape that is to be reproduced on the stone block. The degree of slope of profile line 37 through which roller 23 rotates defines the differential velocity of descent of the movable chassis and/or the displacement of the carriage. The axis of roller 23 and the sawing wire always remain equidistant.

Reverse slopes can be cut in guide panel 21, thereby causing roller 23 to move in the opposite direction. Reverse slope profile line 41, shown in FIG. 4, is cut in guide panel 21, but stop abutment 40 is located at this change of direction. The direction of the carriage and block must be changed so that the reverse slope of the guide panel can be suitably sawed on the stone block. To avoid improper sawing, the user can block reverse movement of the carriage by lowering on drum 32 the latch of ratchet 34 that controls reverse movement. This embodiment necessitates the constant presence of the operator, however.

According to another embodiment, a pin 42 can be inserted into guide panel 21 to block roller 23 from traversing reverse profile line 41. Pin 42 can be equipped with a contactor connected to a timer controlling an alarm to alert the operator. This timer is adjusted in a manner such that pin 42, when it reaches pin 42, sets off the alarm; the timer is set for the amount of time necessary for roller 23 to complete traversing profile line 37 before pin 42 abuts roller 23. When the alarm stops, the operator removes pin 42 and the roller recommences the trajectory described for it by profile line 41 without wasting time or allowing the wire band saw to continue sawing, without moving, in one place in the block.

The operation of the wire saw according to the present invention comprises the step of first placing the block to be shaped on the carriage, positioning the starting point of the shape directly beneath the wire band saw, lowering the wire saw to contact with the block, engaging roller 23 of guide arm 22 on the upper portion of profile line 37 provided in guide panel 21, advancing or retracting angle iron 27 positioned on bar 24 until the rear portion of guide panel 21 is in perfect contact with the vertical arm of angle iron 27, tightening down the bolts engaged in the slit of the vertical arm of angle iron 27. Counterweights 16 and 30 are then adjusted to impart the desired speed to the carriage and movable chassis 1; screw gear 31 is synchronized also so that the carriage advances at the rate of speed desired. Saw drive motor 39 is energized to activate the wire saw in the same manner as for traditional wire saw apparatus. Chassis 1 movement and the carriage are freed for movement by raising the latches of ratchets 10 and 34 controlling descent and advancement, respectively.

In certain cases where a change of slope is required in the cutting, for example, in the case of a convex tombstone, the user must change the direction of movement of the carriage. In this case, one positions pin 42 at the point on guide panel 21 at which there is a change in direction. When pin 42 stops movement of roller 23, the alarm is sounded. At this moment gear 30 is disengaged, the cable of counterweight 33 is unwound, and the cable is then wound up in the other direction on drum 32. The counterweight again is raised to its initial height. The latches on ratchet plates 34 are then, reversed, i.e., the engaged latch is disengaged and vice versa to safeguard reverse movement of the carriage. Gear 30 is then reengaged, pin 42 is removed from guide panel 21, and the sawing recommences in the new direction.

The wire saw according to the present invention makes possible a very large increase in productivity for the shaping of granite and other stone. It is expected that new perspectives in the use of granite and other stone construction will be envisioned by virtue of a substantial decrease in the cost of manufacture resulting from the use of the wire saw according to the present invention.

It is evident that any variations and improvements within the field of technical equivalence can be made in the present invention without going beyond the scope of the claims.

What is claimed is:

1. An apparatus for shaping a stone comprising:
   (a) a fixed vertical frame;
   (b) a chassis vertically displaceable in said fixed frame and adapted to carry an endless wire band saw for sawing said stone;
   (c) a carriage supporting said stone, wherein said carriage is adapted to be displaced;
   (d) a means for automatically lowering said movable chassis to saw said stone on said carriage;
   (e) a means for automatically displacing said carriage during sawing of said stone;
   (f) a guide arm comprising first and second ends, wherein said first end is attached to said chassis and wherein said second end comprises a roller, wherein said guide arm extends downwardly from said chassis; and
   (g) a guide panel attached to said carriage, wherein said guide panel comprises a profile line thereon, wherein said profile line comprises a first end and a second end, wherein said first end is vertically higher than said second end, wherein said roller comprises means for engaging said first end of said profile line before said stone is sawed and for traveling along said profile line from said first end to said second end as said stone is sawed, thereby controlling the velocity of said carriage and said chassis during sawing.

2. The apparatus define by claim 1 wherein said lowering means lowers said chassis at a first speed, and said displacing means displaces said carriage at a second speed, wherein said first and second speeds are different.

3. The apparatus defined by claim 2 wherein said displacing means displaces said carriage horizontally.

4. The apparatus defined by claim 2 further comprising a means for stretching said sawing wire; and means for distributing abrasive liquid comprising an abrasive liquid reservoir and a pump for pumping liquid from said abrasive liquid reservoir.

5. The apparatus defined by claim 2 in combination with an endless wire band saw, said apparatus further comprising means for tensioning said endless wire band saw.

6. The apparatus defined by claim 2 wherein said displacing means comprises a guide panel having a particular shape and means for displacing said carriage, attached to said guide panel and said carriage, such that the shape of the cut in said stone produced by said saw is the same as the shape of said guide panel.

7. The apparatus defined by claim 6 wherein said displacing means further comprises a counterweight, a pulley, and a cable wherein said pulley connected said fixed frame suspends said counterweight at one end of said cable and wherein the other end of said cable is fixed to said chassis.

8. The apparatus defined by claim 2 wherein said lowering means comprises:
   (a) a first shaft attached to said frame;
   (b) a first toothed wheel that rotates on said shaft;
   (c) a drum rotatable on said shaft;
   (d) a cable wound around said drum;
   (e) a counterweight wherein said counterweight is attached to an end of said cable wound on said drum so that said counterweight is raised or lowered as said drum winds or unwinds said cable;
   (f) a second shaft adapted to be rotationally driven;
   (g) a conical pinion attached to said first shaft and rotationally driving said first shaft;

(h) a second toothed wheel that engages with said first toothed wheel;

(i) a third shaft, integral with said second toothed wheel;

(j) a chain operating wheel attached to said third shaft;

(k) a ratchet comprising a latch, both of which are attached to said third shaft and both of which comprise means for blocking descent of said chassis; and (l) a ratchet wheel integral with said third shaft for driving said third shaft.

9. The apparatus defined in claim 8 wherein said rotationally driven shaft further comprises at each of its ends a drum and cable wherein said cable is attached to said drum and to said vertical chassis.

10. The apparatus defined by claim 5 wherein said means for tensioning an endless wire band saw comprises two arms journalled on said vertical chassis and two wire pulleys rotatable on the opposite ends of said arms wherein said pulleys are adapted to be displaced as close as possible to the stone block to be sawed to eliminate all slack in said wire band saw during sawing.

11. The apparatus defined by claim 10 wherein said means for tensioning an endless wire band saw further comprises a motor that drives said wire band saw.

12. The apparatus defined by claim 10 wherein said means for tensioning said endless wire band saw further comprises telescopic dividers attached to said fixed vertical frame wherein said telescopic dividers fix the distance between said wire pulleys.

13. The apparatus defined by claim 1 wherein said lowering means comprises a motor for moving said movable chassis mounted to said fixed frame, a pinion mounted to said fixed frame, a first shaft mounted on said fixed frame, a wheel mounted on said first shaft, an eccentric cam mounted on said first shaft, a connecting rod journalled on said eccentric cam, a second shaft mounted on said fixed frame, and a ratchet wheel that rotates about said second shaft, a latch engaging said ratchet wheel, wherein said connecting rod is connected to said latch.

14. The apparatus defined by claim 13 wherein said lowering means further comprises a disengagement system of said ratchet wheel comprising a roller adapted to roll over the teeth of said ratchet wheel, a slide positioned on said second shaft, an engagement plate on said ratchet wheel, and a spring resting on the teeth of said ratchet wheel wherein said connecting rod actuated by said eccentric cam slidably moves on said second shaft and engages said engagement plate pushing back said spring resting on said teeth of said ratchet wheel so that said ratchet wheel is advanced one tooth as said motor transmits force through said pinion and said wheel rotates said first shaft.

15. The apparatus defined by claim 1 wherein said displacing means comprises a bar, a rack, a pinion, and a counterweight wherein said rack is attached underneath said bar, said bar is attached horizontally to said fixed frame, and said pinion is mounted to said fixed frame, wherein said counterweight comprises means for driving said pinion, wherein said rack is driven by said pinion.

16. The apparatus defined by claim 1 further comprising means for controlling the velocity of said endless wire band saw, wherein said controlling means comprises a guide arm attached to said fixed frame at its upper end, a roller, and a guide panel, wherein said guide panel comprises an opening or profile line therein, wherein said guide arm carries on its lower end said roller, wherein said roller is adapted to move in said opening, wherein said guide panel is attached to said bar attached to said rack of said block-carrying carriage.

17. The apparatus defined by claim 14 wherein said displacing means further comprises a cable winding drum, a handle, a screw gear, a cable, a gear disengagement system, and two ratchets equipped with latches each affixed to said fixed frame, wherein said counterweight is attached to said drum by means of said cable, wherein said handle, said gear disengagement system, said drum and said cable comprise means for vertically displacing said counterweight when said gear disengagement system is engaged and said cable is wound on said drum, wherein said screw gear comprises means for controlling and said screw gear controls the rate of speed of the vertical displacement of the counterweight, wherein said ratchets and latches comprise means for preventing either forward or rearward movement of said drum when in an engaged position.

18. The apparatus defined by claim 16 wherein said guide panel further comprises at least one pin inserted into said panel, a contactor, and a timer including an alarm, wherein said contactor and said timer are positioned on said pin, wherein said pin, wherein said roller follows the exact profile of said opening of said guide panel, wherein said timer and said pin comprise means for alerting an operator of said apparatus that the direction of sawing must be changed when said roller contacts said pin.

19. The apparatus defined by claim 1 wherein said guide panel and said profile line is non-electrical.

20. The apparatus defined by claim 1, wherein said lowering means comprises:

a first rotatable shaft;

means for connecting said first rotatable shaft to said chassis so that rotation of said first rotatable chassis raises and lowers said chassis;

a ratchet wheel attached to said first rotatable shaft, wherein said ratchet wheel comprises a plurality of teeth;

an engagement plate biased into contact with said ratchet wheel;

means for driving said ratchet wheel;

wherein said engagement plate comprises means for sliding on said ratchet wheel in response to said guide arm encountering resistance to downward movement caused by said profile line of said guide panel.

21. The apparatus defined by claim 20 wherein said lowering means further comprises:

a second rotatable shaft operatively connected to said first rotatable shaft, wherein said second rotatable shaft rotates in response to rotation of said first rotatable shaft;

at least one winding drum attached to said second rotatable shaft;

a first cable adapted to be wound on said winding drum, wherein said first cable is attached to said chassis and wherein said first cable raises and lowers said chassis in response to rotation of said winding drum and said second rotatable shaft;

a motor comprising a shaft; and an arm comprising a latch for pushing the teeth of said ratchet wheel, wherein movement of said arm is responsive to said rotation of said shaft of said motor.

22. The apparatus defined by claim 21 wherein said first rotatable shaft further comprises a toothed wheel, wherein said second rotatable shaft further comprises a conical pinion, wherein said lowering means further comprises:
- a third rotatable shaft comprising a drum, a toothed wheel and a conical pinion, wherein said conical pinion of said third rotatable shaft is adapted to engage said conical pinion of said second rotatable shaft, wherein toothed wheel of said first rotatable shaft is adapted to engage said toothed wheel of said third rotatable shaft;
- a counterweight; and
- a second cable, wherein said second cable attaches said counterweight to said drum of said third rotatable shaft.

23. An apparatus for shaping a stone comprising:
(a) an endless wire band saw;
(b) a fixed vertical frame;
(c) a chassis vertically displaceable in said fixed frame and adapted to support said endless wire band saw;
(d) a carriage supporting said stone, wherein said carriage is adapted to be displaced;
(e) a means for automatically lowering said movable chassis to saw said stone on said carriage;
(f) a means for automatically displacing said carriage during sawing of said stone;
(g) means for tensioning said endless wire band saw comprising two arms journalled on said vertical chassis and two wire pulleys, wherein one wire pulley is attached to one end of each of said two arms, wherein said arms comprise means for displacing said pulleys as close as possible to the stone block to be sawed to eliminate all slack in said wire band saw during sawing.

24. The apparatus defined by claim 23 wherein said tensioning means further comprises a plurality of telescopic dividers, one end of each telescopic divider being attached to said fixed vertical frame and the other end of each telescopic divider being attached to one of said wire pulleys.

25. The apparatus defined by claim 24 wherein said vertical chassis comprises two spaced apart upright elements and a cross beam extending between said two upright elements, wherein said cross beam is positioned between the two ends of said upright elements, wherein said arms each comprise two elements each positioned against said cross beam on opposite sides of said cross beam, thereby preventing all lateral displacement of said arms.

* * * * *